G. MOORE.
PROCESS OF REPLACING A LIQUID CONTAINING SUSPENDED SOLIDS BY ANOTHER LIQUID.
APPLICATION FILED JUNE 12, 1913.
1,279,573.
Patented Sept. 24, 1918.
6 SHEETS—SHEET 1.
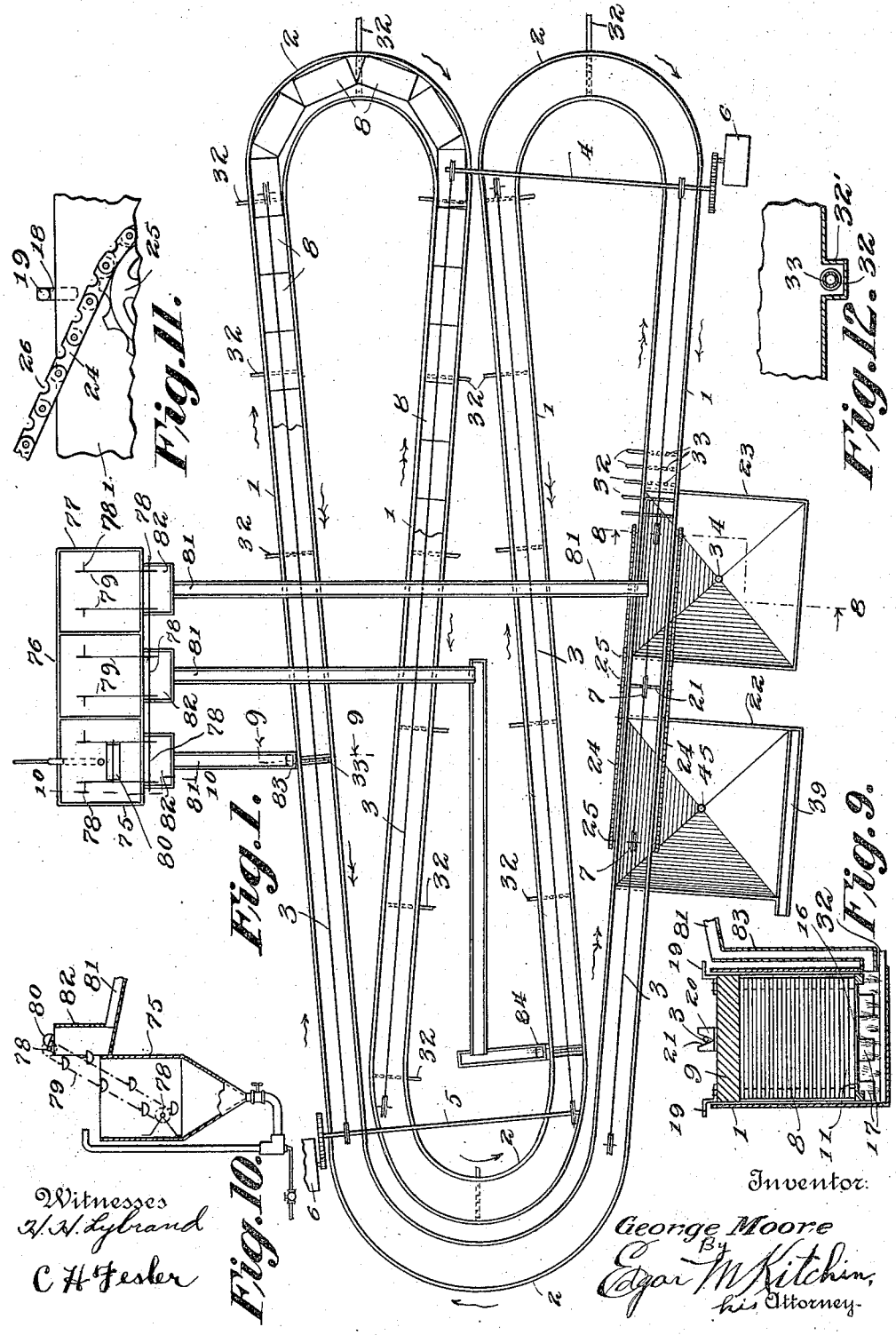
Witnesses
H. H. Lybrand
C. H. Fesler
Inventor
George Moore
By Edgar M. Kitchin,
his Attorney G. MOORE.
PROCESS OF REPLACING A LIQUID CONTAINING SUSPENDED SOLIDS BY ANOTHER LIQUID.
APPLICATION FILED JUNE 12, 1913.
1,279,573.
Patented Sept. 24, 1918.
6 SHEETS—SHEET 2.
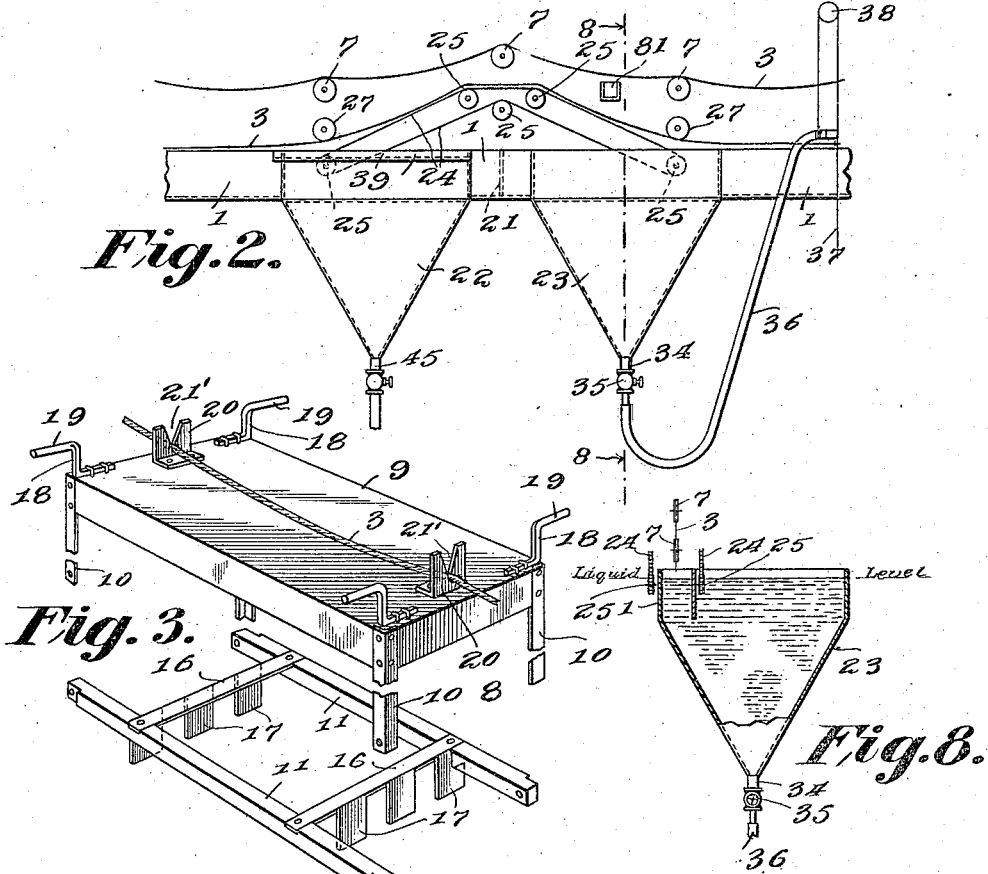
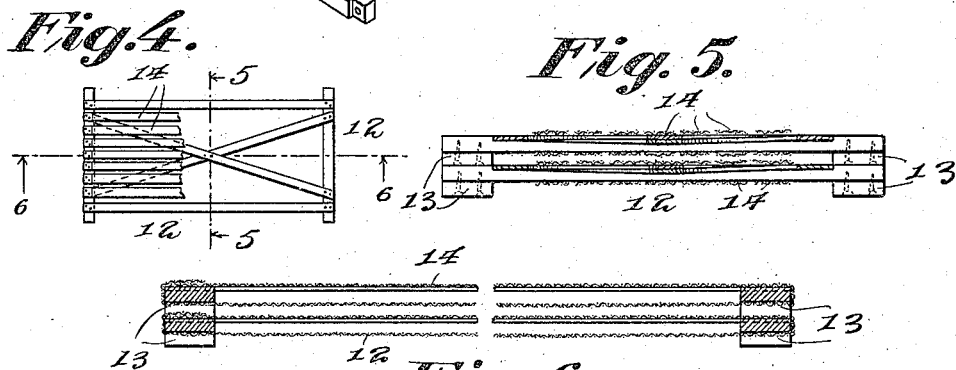
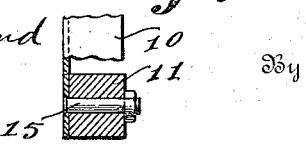
Witnesses
N. H. Lybrand
C. H. Fesler
Inventor
George Moore
By Edgar M. Kitchin
his Attorney.

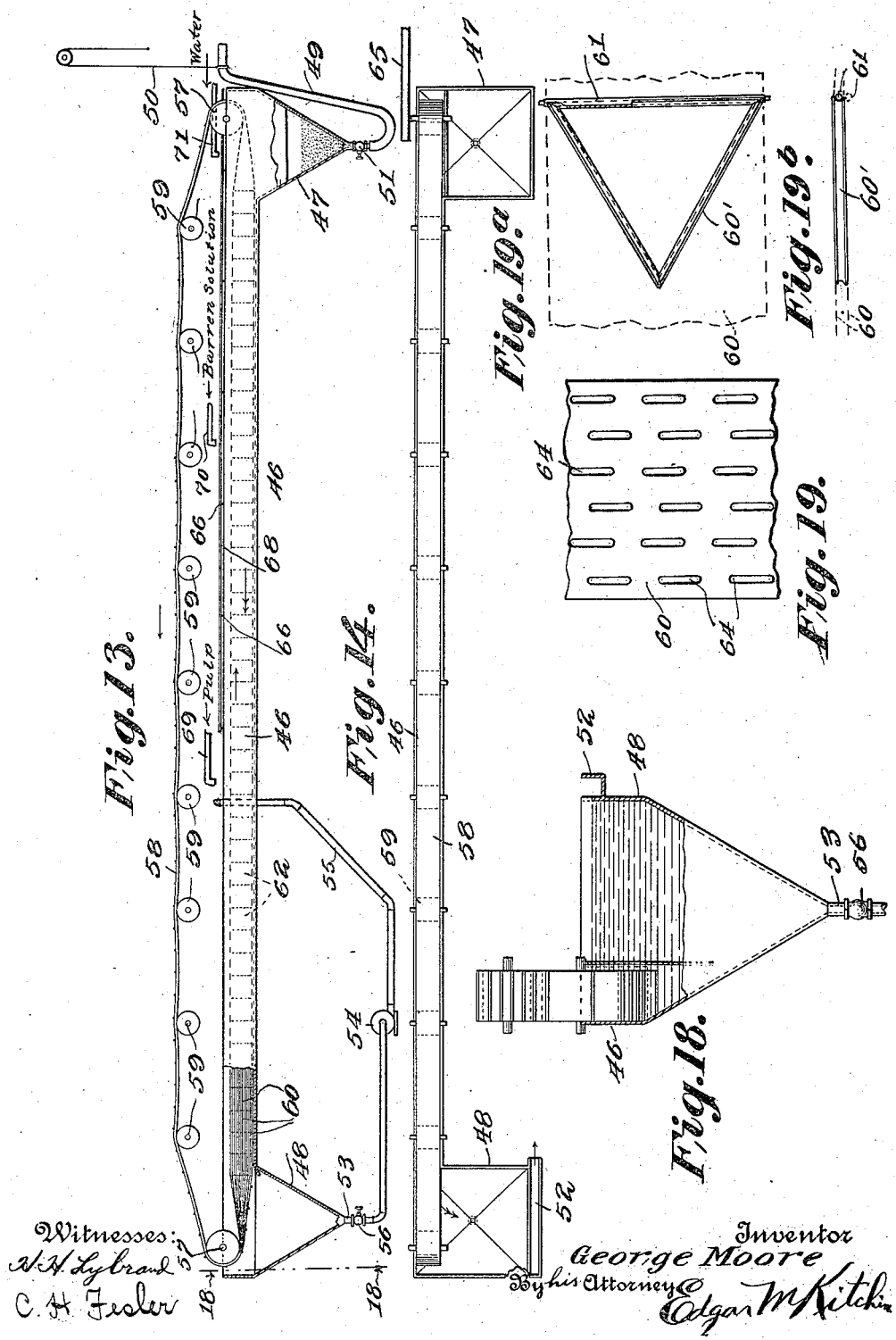

G. MOORE.
PROCESS OF REPLACING A LIQUID CONTAINING SUSPENDED SOLIDS BY ANOTHER LIQUID.
APPLICATION FILED JUNE 12, 1913.
1,279,573.
Patented Sept. 24, 1918.
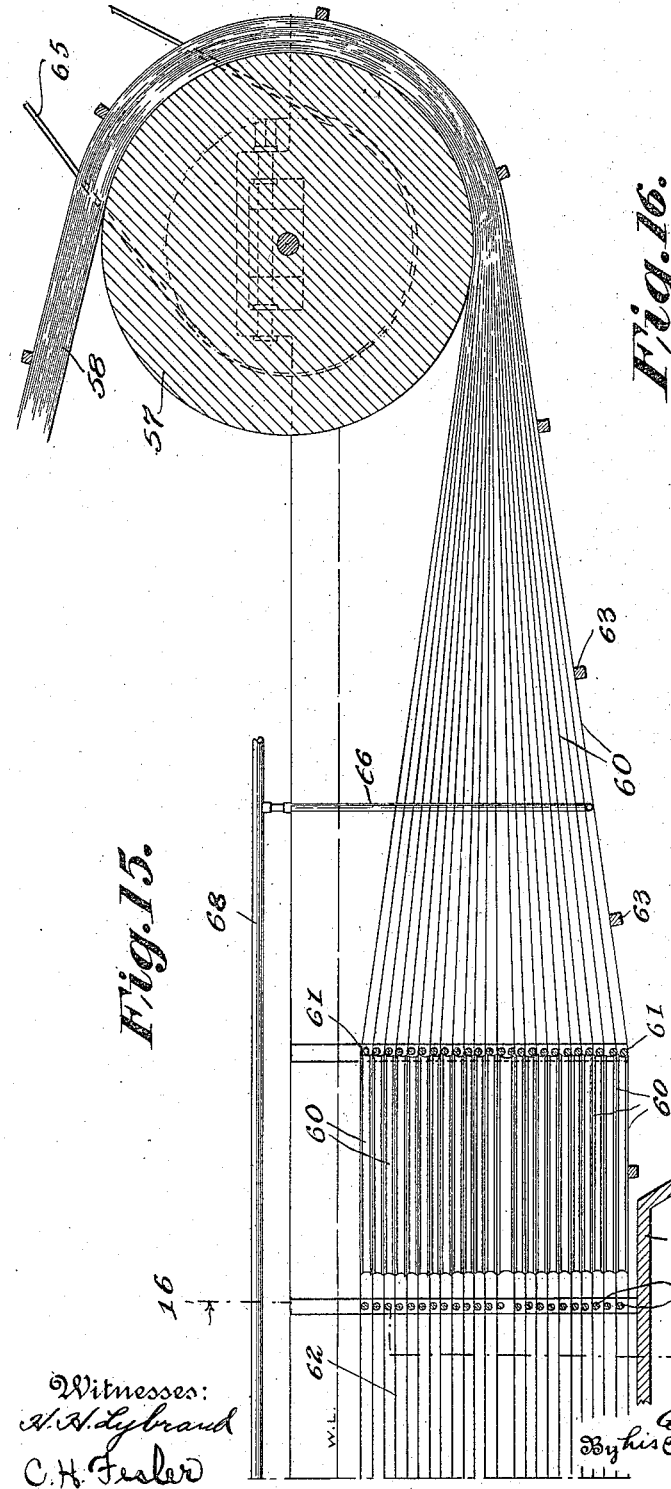
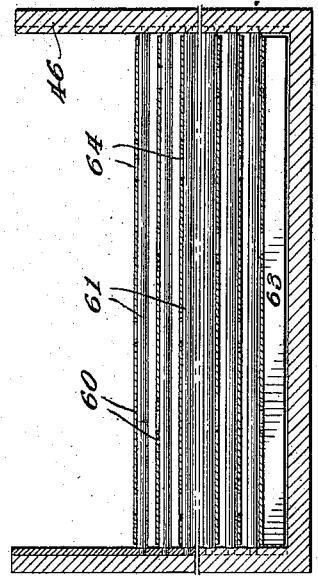
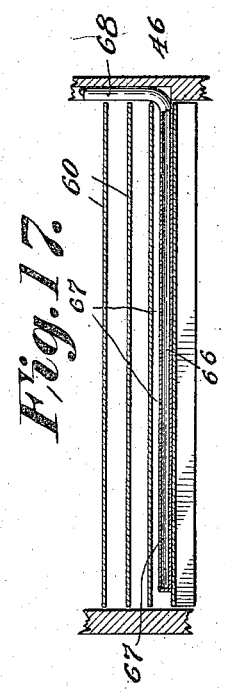

G. MOORE.
PROCESS OF REPLACING A LIQUID CONTAINING SUSPENDED SOLIDS BY ANOTHER LIQUID.
APPLICATION FILED JUNE 12, 1913.
1,279,573. Patented Sept. 24, 1918.
6 SHEETS—SHEET 5.
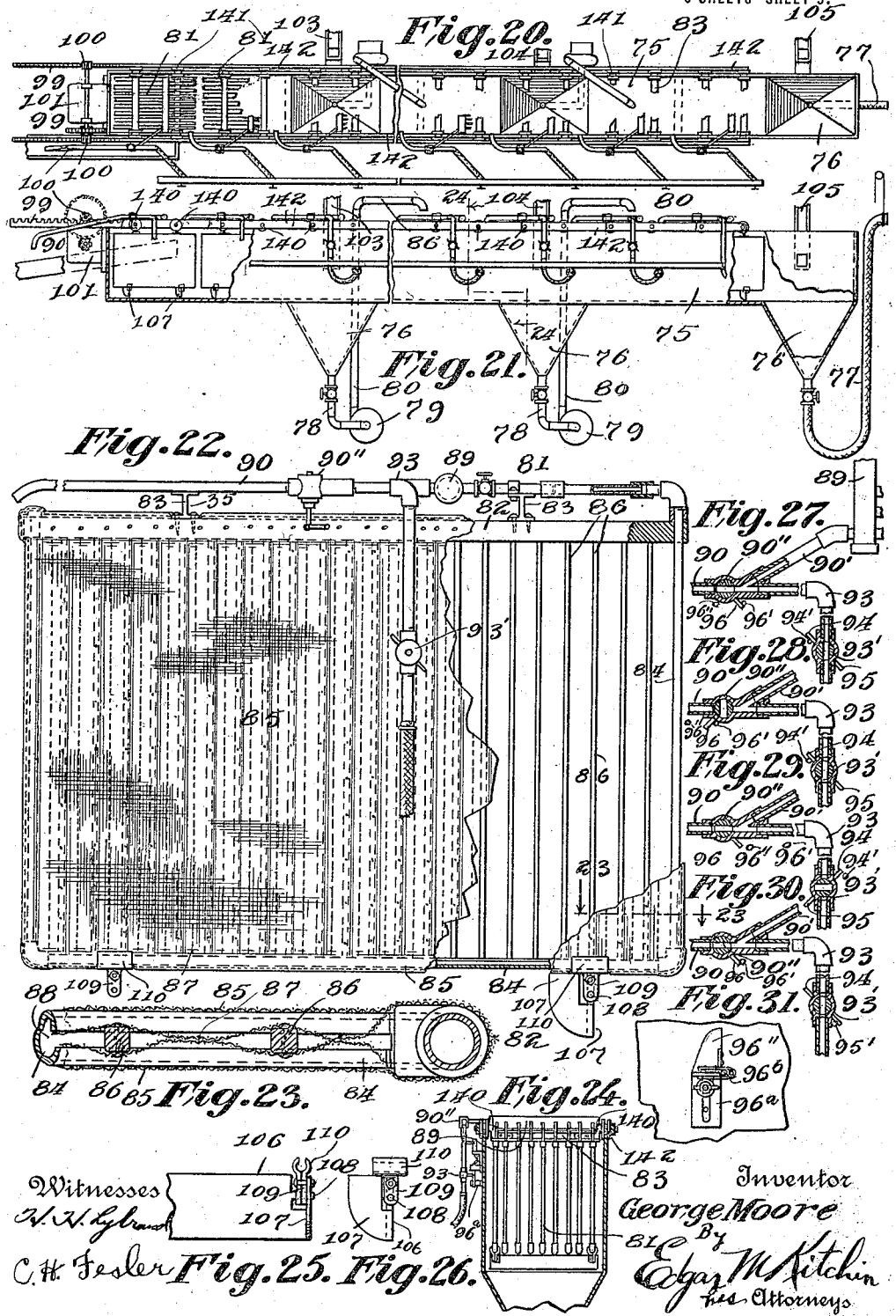

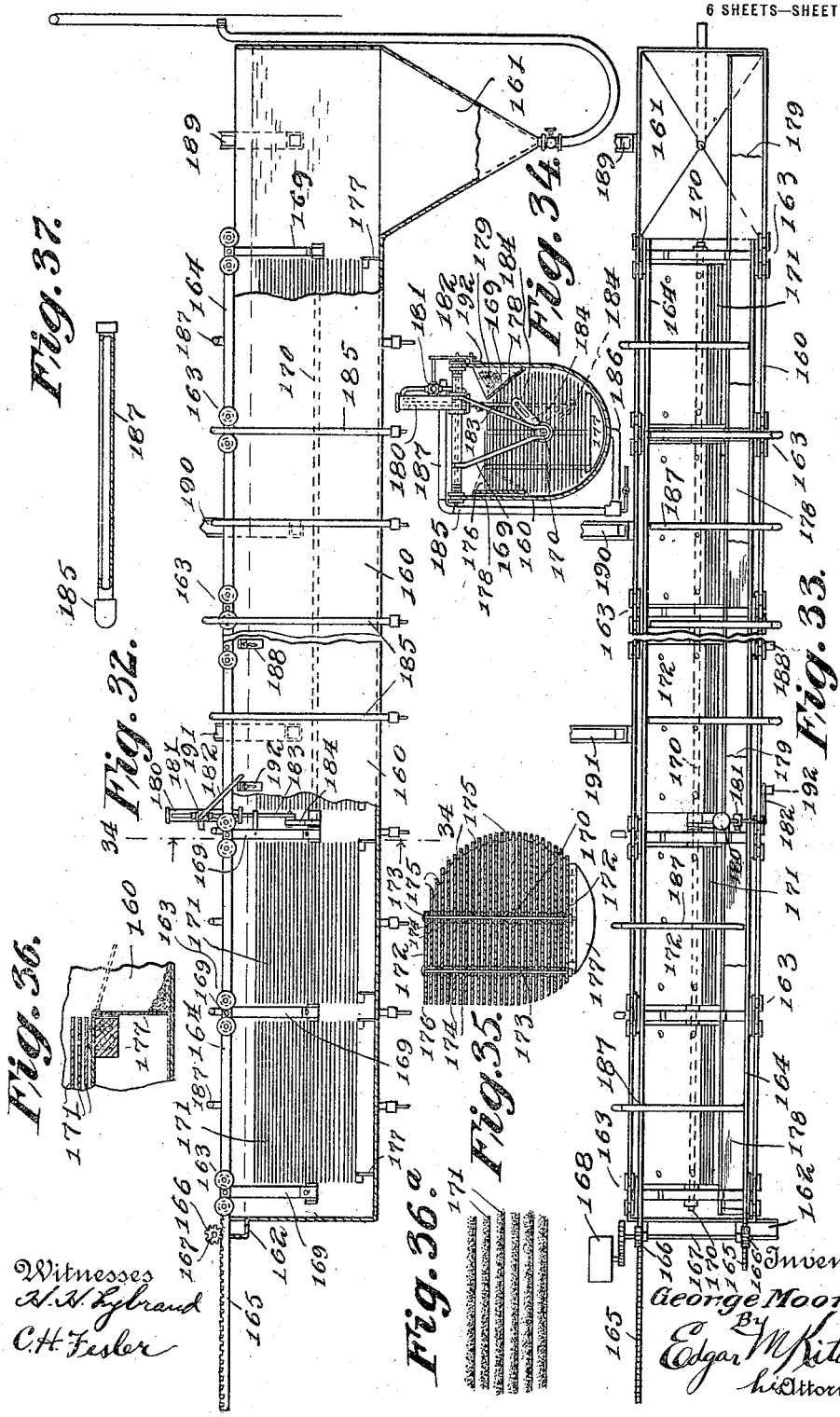

UNITED STATES PATENT OFFICE.

GEORGE MOORE, OF JOPLIN, MISSOURI.

PROCESS OF REPLACING A LIQUID CONTAINING SUSPENDED SOLIDS BY ANOTHER LIQUID.

1,279,573.  Specification of Letters Patent.  Patented Sept. 24, 1918.

Application filed June 12, 1913. Serial No. 773,259.

*To all whom it may concern:*

Be it known that I, GEORGE MOORE, a citizen of the United States, residing at Joplin, in the county of Jasper and State of Missouri, have invented certain new and useful Improvements in Processes of Replacing a Liquid Containing Suspended Solids by Another Liquid; and I do hereby declare the following to be a full, clear, and exact description of the invention, such as will enable others skilled in the art to which it appertains to make and use the same.

The practising of the process comprising this invention is characterized by progressively opposing movements interrupted intermittently by intermingling of replacement fluid and solids for recovering valuable solutions from the solids.

Incident to such recovery of valuable solutions is the economic handling of valuable replacing fluid by the substitution therefor of practically valueless replacing fluid substantially without dilution of the valuable replacing fluid.

While the invention is independent of any particular mechanism, it is adapted for successful demonstration by the aid of numerous forms of apparatus, and comprises certain novel steps and combinations there as will in part hereinafter become apparent and in part be pointed out.

For facility of disclosure of the process, simple forms of apparatus adapted for practising the process will be described in detail, and have been delineated in the accompanying drawings, in which—

Figure 1 is a plan view.

Fig. 2 is a fragmentary, side elevation of parts seen in Fig. 1.

Fig. 3 is an enlarged, detail perspective view of portions of one of the settling baskets, the settler surface frames being omitted.

Fig. 4 is a plan view of one of the settler surface frames detached and shown on a scale reduced relative to the scale of Fig. 3.

Figs. 5 and 6 are vertical sections taken on the planes indicated by lines 5—5 and 6—6 respectively of Fig. 4, the parts being seen on an enlarged scale.

Fig. 7 is a detail section through the bottom frame connection.

Fig. 8 is a vertical section taken on the plane indicated by line 8—8 of Fig. 1.

Fig. 9 is a similar section taken on the plane indicated by line 9—9 of Fig. 1, the parts being shown on an enlarged scale.

Fig. 10 is a vertical section taken approximately on the plane indicated by line 10—10 of Fig. 1.

Fig. 11 is an enlarged detail view of a fragment of one of the basket lifting chains.

Fig. 12 is a detail, longitudinal, vertical section illustrating the disposition of one of the air jet pipes.

Fig. 13 is a view in side elevation of another apparatus adapted for carrying out the process.

Fig. 14 is a plan view thereof.

Fig. 15 is an enlarged, vertical section through a fragment of one end thereof.

Fig. 16 is a transverse section taken on the planes indicated by line 16—16 of Fig. 15.

Fig. 17 is a fragmentary cross section taken in the plane of one of the air jet pipes.

Fig. 18 is a transverse section taken on the plane indicated by line 18—18 of Fig. 13.

Fig. 19 is an enlarged, fragmentary plan of one of the webs of the belt.

Figs. 19$^a$ and 19$^b$ are detail views in plan and elevation respectively of one of the web scrapers.

Fig. 20 is a plan view of another form of apparatus adapted for carrying out the process.

Fig. 21 is a view in side elevation thereof.

Fig. 22 is an enlarged view partly in side elevation and partly in longitudinal section of one of the settlers.

Fig. 23 is a fragmentary, horizontal section taken on the plane indicated by line 23—23 of Fig. 22.

Fig. 24 is a transverse section taken approximately on the plane indicated by line 24—24 of Fig. 21.

Figs. 25 and 26 are detail, fragmentary views of one of the scrapers.

Figs. 27, 28, 29 and 30 are detail sectional views showing successive positions of one set of the siphon valves.

Fig. 31 is a detail view of one of the trip fingers.

Fig. 32 is a view in side elevation of a further apparatus adapted for practising the process, parts being broken away for disclosing interior structure.

Fig. 33 is a plan view thereof.

Fig. 34 is a transverse section taken on a plane indicated by line 34—34 of Fig. 32.

Fig. 35 is an enlarged, detail cross section of one of the rotary baskets, parts being seen in elevation.

Fig. 36 is an enlarged detail, fragmentary view of one of the scrapers and contiguous parts.

Fig. 36ᵃ is a fragmentary, detail, sectional view of the settler surfaces proportioned on a scale approximately full size.

Fig. 37 is an enlarged, detail, horizontal, sectional view of the distributer of one of the circulating devices.

The expression "settler surface" is employed herein as indicating a face of any member capable of sustaining settled solids, the expression itself being employed in lieu of specific mention of the member, and without an explanatory phrase with each use, the necessary physical structure bearing the surface being intended to be included by the simple reference to the settler surface.

For the sake of brevity, and clearness of presentation of the process, the steps thereof will be set forth in detail incident to a statement of the operation of the several apparatus shown in the accompanying drawings.

Referring to the drawings by numerals, 1 indicates an elongated, trough-like tank, which preferably assumes the sinuous contour illustrated for the sake of saving of space without sacrifice of the length or capacity of the tank. As illustrated, the tank is provided with four straight sections or laps appropriately connected by curved portions, indicated at 2, 2, each of the curved portions being formed with a cross sectional area greater than that of the straight sections for permitting freedom of movement of contained parts as hereinafter specified. The sinuosity of the tank 1 is such as to cause the straight laps to appear in pairs of parallel sections, and extending longitudinally of each of the straight laps is a driving cable 3, the cables 3 of one pair of parallel sections being driven from a shaft 4, and the other cables being driven from a shaft 5, the shafts 4 and 5 being actuated appropriately, as by alternating current motors 6, 6, which are connected in the same circuit to insure synchronous movement of the actuated parts. The return lap of each cable 3 is supported by any suitable idlers 7, 7, omitted from Fig. 1 for the sake of clearness of disclosure, the lower lap of each cable being the power delivering section thereof.

The tank 1 is supplied throughout its length with settler baskets, indicated by the general reference character 8, a sufficient number of baskets being provided for insuring maintenance of end contact throughout the tank. The details of each basket 8 consist of a top float 9 having pendent corner bars preferably of angle form indicated at 10, the lower ends of which are engaged by the bottom frame 11, and the intermediate space between the bottom frame 11 and the under face of float 9 is filled with settler frames 12. Each frame 12 may be variously constructed, but preferably consists of end cross pieces and longitudinal connecting pieces and crossed connecting pieces engaging said cross pieces. Each end cross piece of each frame is of a length to fit snugly between the angle pieces 10 at one end of float 9 and each end of each of said cross pieces is provided with a spacing block 13. Each frame 12 is provided with settler surfaces 14, which may be of canvas, sheet iron or other material. Said surfaces are spaced apart in the width of the frame and extend longitudinally thereof, so as to provide intermediate spaces therebetween, and obviously such spaces may be otherwise formed as by perforation of the surfaces themselves. The blocks 13 space the frames 12, and prevent face contact of the settler surfaces of the several frames. A sufficient number of frames 12 is introduced beneath the float 9 of a given basket 8 for filling the space from the under face of the float down to the plane of the upper face of the bottom frame 11, the size of each frame 12 being such as to snugly fit within the angles 10, and all of said frames are held in position by bolts 15 extending through the respective angle pieces 10 and the adjacent end portions of the side bars of the bottom frame 11. Each bottom frame 11 consists of a pair of side bars connected by cross plates 16, 16, from which depend scrapers 17, 17, the scrapers 17 of each plate 16 being spaced apart edgewise, and being staggered with relation to those of the other plate 16. Fixed to each float 9 are brackets 18, 18, one disposed adjacent each corner thereof and having an outstanding finger 19 disposed to overhang the respective edges of the tank 1. Fixed to and upstanding from each float 9 are brackets 20, 20, which are preferably disposed in the central line of the float and are formed with upwardly opening V-shaped notches 21' adapted to receive the lower lap of cable 3 for enabling the cable to move the respective baskets along the tank 1. The float 9 consists preferably of a rectangular piece of wood, but may be otherwise suitably constructed and is proportioned to insure floating of the baskets substantially after the manner indicated in Fig. 9.

The tank is provided with a partition wall 21 disposed across one of the straight laps of the tank. At one side of this partition is the clarifying settler tank 23, and at the other side thereof the thickened solids settler tank 22, both of said settler tanks extending beneath and across the respective adjacent portions of tank 1 and being formed integral therewith or being connected thereto so as to substantially form a part of tank 1, the bottom of the tank 1 being omitted throughout those portions of its length which extend across the tanks 22 and 23. At each side of tank 1, adjacent to the partition 21, is arranged a basket carrier chain 24 which is supported on idlers 25, 25. Each chain 24 is suitably constructed for effectively engaging the fingers 19. As seen in Fig. 11 the links of each chain 24 are notched, as indicated at 26, so that in operation as a given basket approaches the chains 24 the forward fingers 19 will engage said chains and be lifted thereby until, during the continued movement of the basket, the rear fingers 19 engage the chains, and then the entire basket is lifted by the chains up and over the partition 21 and lowered into the tank beyond the partition, the idlers 25 being disposed in such position as to maintain the requisite incline of chains 24 for assuring this result, it being obvious that the descending baskets at one side of the partition 21 will serve to elevate or materially aid in elevating the ascending baskets at the opposite side thereof. The movement of the baskets is, however, positively assured by the engagement of cable 3, the lower lap of which is held in operative engagement with the brackets 20 of the several baskets during their ascent, movement across and descent beyond the partition 21 by the engagement of the idlers 27, 27, with said lower lap. The direction of travel of the several baskets 8 is indicated by the single pointed arrows in Fig. 1, and thus it will be noted that the successive baskets 8, moving along the tank 1, and entering tank 23, are lifted out of the tank, over partition 21, and lowered into the tank beyond the partition.

When metal bearing pulp is being treated, the first replacing fluid is the solvent solution, as cyanid in case of precious metals, which, being free from metals, will be hereinafter known as barren solution, and the second replacing fluid is preferably water. A feed apparatus is employed, so as to control the proportionate quantities of water, barren solution and pulp supplied. The feed apparatus may assume various embodiments, one specific type being illustrated in the drawings, and includes supply containers, for pulp, barren solution and water as indicated at 75, 76 and 77, respectively. A drive shaft 78 is common to all of the supply containers, the said shaft receiving power from any appropriate source not seen, and being disposed for driving an elevator 79 within each container. Each of elevators 79 is of the endless bucket type, and is provided with buckets 80, each elevator being sufficiently inclined for causing the buckets to move outside of the plane of the respective containers, and the buckets being disposed for striking the shaft 78, so as to dump into a launder 81, there being a launder 81 provided for each of the containers. A shield or casing 82 is also provided for each container for preventing loss of the discharged fluids through splashing thereof. The number of buckets 80, or the capacity thereof may be varied for effecting the delivery of the desired proportions of each fluid with respect to both of the others. I find that an effective proportion in the treatment of precious metal bearing pulp is two parts of pulp to one part each of barren solution and water, and the buckets 80 will be accordingly proportioned. If through variation of the quality or nature of the pulp, or for any other reason, other proportions are required, they may be readily obtained by supplying additional buckets 80, or by removal of buckets 80 from any one or more of the conveyers 89 or by varying the capacity of the buckets according to the proportions required. The launder 81, which leads from the pulp supply conveyer, extends to a point adjacent to the trough or tank 1, and there discharges into a tube or pipe 83 which extends down to a point adjacent to the bottom of tank 1, and at such point extends through the wall of the tank for delivering the pulp. A similar delivering connection 84 is provided for the launder 81 of the barren solution supply apparatus, but the water may be delivered in any suitable manner to the tank 23. The water launder 81 terminates above the tank 23 at the point where the baskets 8 have been lifted, so that the water falls directly upon the baskets and aids in cleansing their surfaces of solids.

Disposed at spaced intervals along tank 1 are agitators for dislodging settled solids from the settler surfaces 14 of the several baskets 8. While said agitators may assume various embodiments, for the sake of facility of disclosure and ease of operation, I have indicated air jet devices as shown at 32, 32. Each of said air jet devices simply consists of a pipe communication with a source of compressed air supply, not illustrated, the pipe extending across the bottom of the tank 1, and being formed with a series of apertures 33 disposed for directing air jets upwardly. Each pipe 32 is, of course, located below the plane of travel of the lowermost part of the several baskets 8, so that the scrapers 17 may move across and above the pipes 32 without contact. Each pipe 32 is preferably located in a transverse groove 32' in the bottom of tank 1. The spacing of the pipes 32 may vary according to the material being treated, but adjacent to and within the tank 23 at the side of approach of baskets 8, a series of juxtaposed pipes 32 is provided for insuring a succession of blasts for thoroughly agitating the solids and clearing the same from the settler surfaces of each basket just as it is about to be lifted by the chains 24, so as to insure a delivery of the successive baskets in a substantially clean condition to that portion of trough 1 above tank 22, the cleansing of the settler surfaces being assisted by the water supply as above specified. Of course the cleaning operation includes the discharging of the solids into tank 23, in which they settle, and from which they may be removed for any disposition. To facilitate the disposition of the solids, tank 23 is provided with a hopper bottom discharging into a pipe 34, valved as at 35, and communicating with a flexible pipe or hose 36, the free end of which is engaged by a cable 37, which is passed about a supporting pulley 38 for facilitating elevation of the pipe 36 to a point above the liquid level of tank 23, when it is desired to prevent discharge from tank 23. The discharge is effected, when desired, by the lowering of the free end of the pipe 36.

One edge of tank 22 is lowered below the other edges thereof and below the edges of tanks 1 and 23, and a launder 39 is arranged to receive the liquid flowing over this lowered edge. The liquids entering tank 1 are supplied in sufficient quantity to maintain a liquid level therein above the said lowered edge of tank 22, so as to insure a continuous, progressive flow throughout tank 1 toward tank 22, as indicated by the double pointed arrows in Fig. 1.

The operation of the structure above described will illustrate a specific presentation of the improved process. Such operation will be described with respect to precious ore-bearing pulp, it being understood that the operation thus set forth is merely illustrative.

The operation is begun by filling the tank 23 with water and the tanks 1 and 22 with barren solution. Pulp, barren solution and water are supplied through their respective launders 81. The solids of the pulp entering the tank 1 are agitated throughout and between the settler surfaces 14 of the adjacent baskets 8, all of said baskets being caused to travel along the tank 1 by the driving of the several cables 3, the rate of travel being comparatively slow, preferably consisting of a movement at the rate of approximately one foot in ten seconds, or so that the movement of the several baskets will not interfere with the settling of the solids. The movement of the baskets about the curved portions of the tank 1 is effected by the thrust of the baskets in the rear under the driving force of the engaging cable. As any given basket moves from the point of supply of the pulp, the solids will settle on the settler surfaces of the basket until the basket arrives at the point above the first agitator 32, beyond the point of pulp supply. As all of the agitators 32 are operating continuously, the solids will be intermingled with the fluid, the action of the air jets effecting both an agitation of the surrounding fluid and a vibration of the settler surfaces, so that the intermingling is rendered efficient. The agitation of the solids is continued during the further movement of the baskets until the solids are gradually worked out of the line of agitation, and then again settle upon settler surfaces of the baskets, and thus remaining until agitated again, and so on intermittently during their movement throughout the length of the tank 1 until they are deposited in tank 23. It is apparent that the general movement of the solids is in progressive opposition to the movement of the liquid in tank 1, said liquid moving from the point of intake toward tank 22, while the solids are caused to move by their engagement with the settler surfaces of the baskets toward the tank 23, the progression in the movement of the solids being intermittently interrupted, and the processes of agitation and settling being alternated, throughout the progress of the solids along the tank. The replacing liquid is supplied in sufficient quantity to cause the progressive movement of the fluid in the direction indicated by the double pointed arrows, toward the tank 22, while the solids are mechanically forced in the opposite direction by the movement of the baskets 8, as indicated by the single pointed arrows. The valuable solutions eventually find their way as a substantially clarified liquor into tank 22, from which they may be flowed off through the launders 39, or if further clarification is desired, may be removed through a suction filter, or otherwise clarified. Any solids collecting in the bottom portion of tank 22 are preferably drawn from the bottom and returned to tank 1 adjacent to the pulp supply 28. The relative quantities of pulp, barren solution and water must of course be controlled with the two ends in view of preventing loss of values with the tailings, while at the same time avoiding unnecessary increase in the bulk of the mill solution. To ascertain whether these ends are being attained, the liquid in tank 23 is periodically given sample tests, and, in the handling of precious ore-bearing pulp, if the test shows the presence of cyanid or alkalinity, the supply of water is increased. If the tests should show the presence of precious metals, then it will be necessary to increase the supply of barren solution. The bulk of the barren solution or mill liquor in the mill is maintained substantially uniform, the water supplied to tank 23 being only in sufficient quantity to replace barren solution from the solids, and this water is discharged with the tailings and not allowed to dilute the barren solution appreciably. It is, of course, well known that a certain amount of evaporation occurs in mills, and to compensate therefor, a proper percentage of water may be allowed to flow with and become part of the barren solution. However, the ideal development of the present improved process contemplates the final discharge of tailings consisting of the solids of pulp which have gone through the successive steps named, lost their originally contained valuable solutions, and have had water substituted therefor. The water thus substituted is as nearly as possible all the water which is supplied to tank 23 except that compensating for evaporation.

In the course of the operation, the floats 9 are subject to rocking and irregular shifting incident to the escaping of air from beneath through the fluid, and the bubbling and splashing of the fluid occasioned by such escape at times cause fluid to wash across the top of the respective floats or parts thereof. To avoid loss of such fluid from the tank 1, the sides thereof are extended appropriately above the floats.

During the operation, certain quantities of the solids find their way down to the bottom of tank 1, and will be scraped along by the scrapers 17, a relatively thin filament or coating of solids being allowed to remain beneath the scrapers as the scrapers are sustained by the floating basket, preferably slightly above the bottom. Those solids deposited on the bottom, in addition to this filament or coating, are given a rolling or tumbling movement by the scrapers 17, and thus expose ever-changing surfaces of small masses of settled pulp or sand to the action of replacing fluid, while advancing in a direction opposite to the progressive movement of the replacing fluid.

In carrying out the process, as will be apparent, the barren solution in moving in one direction while the solids of the pulp move in the opposite direction through such solution will attack and dissolve values from the solids and also displace dissolved values therefrom, that is replace solutions therein, driving such displaced value-bearing solutions toward tank 22, the replacement consisting of the displacing of the value-bearing solutions by the substitution in the solids of the barren solution, and as the process continues the water replaces the barren solution and thus leaves the solids impoverished of soluble values.

As a further perfecting step in the process, I find that dislodgment of the solids from the settler surfaces by attrition is an effective aid to intermingling of such solids with the replacing fluid. While such intermingling may be attained by vibration or oscillation of the settler surfaces in various ways, one efficient mode consists of reversing the motors 6 and running the same at high speed so as to reverse the direction of travel of cables 3, and thus cause all of the baskets 8 to be suddenly stopped in their progressive movement and moved for a short distance in the reverse direction, the reverse speed being in excess of the rate of flow of the replacing fluid. The rate of reverse movement of the baskets 8 may obviously vary, but should be high enough to effectively attain the object in view, and I find that a reverse rate of approximately ten feet in five seconds is quite effective. Obviously each reversal in the act of stopping the basket will create a relative flow of fluid which will wash or wear the deposited solids from the settler surfaces, and the reverse movement therefore, does not need to be continued for any great distance at a given time, so that the general progress of the baskets in the direction indicated by the single-pointed arrows is maintained. It is desirable to avoid return scraping movement of scrapers 17 during reversal, and to this end modified scrapers, such as later described, may be employed.

It will be noted that the process is not dependent upon any particular mechanism and is adapted for replacing a maximum amount of values or valuable solutions from the solids of pulp by the employment of a minimum bulk replacing solution. The importance in the reduction in amount of barren solution and water necessary to be employed will be recognized as accentuated in the saving both in handling and subsequent treatment and obviation of losses incident to excessive dilution such as involved in the known decantation processes.

The process is carried out after the manner above set forth, the solids continuing their movement toward the tank 23 until deposited therein as tailings, while the replacing fluid moves on toward the tank 22 and eventually enters the same, except those portions of the replacing liquid which remain with the solids and are discharged therewith from the tank 23, such portions being only the non-value bearing water.

Considering "thickening" as any method of increasing the percentage of solids relative to the percentage of liquid, and considering "thinning" as any method of increasing the percentage of liquid relative to the solids, it will be observed that in carrying out the process after the manner above set forth, the pulp is subjected to alternate actions of thickening and thinning, each thinning being done with and the thickening being done from solution of less value than that with which the preceding thinning (or thickening) was done, and between each action of thinning, the thickened pulp, that is the pulp which has settled on the settler surfaces of the baskets, is advanced in a direction opposite to the direction of flow of the replacing fluid or liquid with which the preceding thinning was done. Obviously, the thickening is accomplished by settling of the solids, and the thinning is accomplished by agitation thereof. Settling may be either natural, that is effected by gravitation, or may be superinduced mechanically as by apparatus hereinafter specified.

In Figs. 13 to 19<sup>b</sup> inclusive, I have illustrated a very simple and inexpensive form of apparatus adapted for the carrying out of the process. Reference being had particularly to said figures, 46 indicates an elongated trough-like tank, one end of which opens into a thickener settler tank 47, and the other end of which opens into a clarifying settler tank 48, the former tank having a discharge hose 49 with its free end supported by a cable 50 by which the said free end is adapted to be moved past the liquid level in the tank. Thus by lowering the free end of the tube 49 the thickened solids may be discharged from the tank, and the discharge may be cut off merely by raising the free end of tube 49 above the liquid level of the tank. A controlling valve 51 is also provided for shutting off the discharge when desired. A launder 52 is extended along one side of tank 48 for delivering liquor from the tank. For drainage purposes, as in the instance of cleaning the tank, a drain pipe 53 is provided and communicates with the tapered bottom of the tank, the pipe being controlled by a valve 56. Pipe 53 is extended to a pump 54 which discharges through pipe 55 back into trough 46.

Drums 57, 57, are journaled in the upper edges of the respective tanks 47 and 48 in position for supporting and driving a belt 58 in line with and extending throughout the length of the trough or tank 46, the lower lap of the belt moving within the trough and the upper lap being sustained above the trough as by a series of idler pulleys 59. The belt 58 is made up of a series of continuous, independent plies or webs 60, 60, each of which extends throughout the belt and forms an independent unit thereof. Throughout that lap of the belt 58 which lies above the trough, the several webs 60 lie in face contact and form a compact fabric, but throughout the lap disposed within the trough, the several webs are separated and maintained spaced apart by retaining bars 61, 61, arranged in spaced series, each series consisting of a number of vertically alined bars engaging the several webs of the belt and each series forming a partition wall dividing the tank into compartments 62, which in carrying out the process, as will hereinafter appear, serve as means of confinement against diffusion, each partition wall thus formed tending to restrict the square section of the flow across the partition, and to prevent eddying currents moving in a direction opposite to the general flow of the fluids.

The web 60 of belt 58 which appears lowermost in tank 46 is provided with a series of cross slats or bars 63, 63, adapted, during movement of the belt, to move along adjacent to or in contact with the bottom of the tank 46. Each web 60 is perforated, as clearly indicated in Fig. 15, being formed with apertures 64, 64, for permitting the circulation of pulp through the respective webs and also enabling agitation of solids therethrough. Each of the webs is formed of canvas, or other suitable fabric or material, and all of the webs are, in operation, driven uniformly by power supplied to one of the drums 57, by a driving belt 65 or other means from any suitable source not illustrated. The rate of travel of the webs may obviously be varied according to the substance being treated, as for example, in the practising of the present improved process on ore-bearing pulp the belt is preferably caused to move approximately at the rate of one foot in ten seconds, or at such slow rate as not to interfere with the settling of solids.

Disposed at intervals of the length of tank 46 are arranged agitators, each of which in its simplest form consists of an air supply tube 66 which extends transversely of the belt and above the lowermost web thereof, and is provided with a series of air jet apertures 67, each pipe 66 extending downwardly from the main supply pipe 68, and being bent to extend horizontally across the trough, the horizontal portion only being preferably provided with the apertures 67, but obviously other apertures may be arranged as desired.

Spaced some distance longitudinally of tank 46 from tank 48 is a supply pipe 69 for the material to be treated, and spaced from pipe 69 toward tank 47 is a barren solution supply pipe 70, and discharging into the tank 47 is a water or other displacement fluid supply pipe 71. The relative proportions of the supply of the several fluids is controlled by apparatus such as shown and described in the structure seen in Fig. 1.

Arranged just in advance of the last series of bars 61 are scrapers 60', one scraper 60' being provided between each two of the webs 60, so as to scrape the upper surface of one and the under surface of the other. Each scraper 60' is formed of concaved members disposed in V-shape with the apex directed forwardly and the base of the members connected by a similar concaved member fitting and partly inclosing the respective rod 61. The concavity of each member of the respective scraper 60' gives to the scraper an upper scraping edge and a lower scraping edge, and the inclination of the members serves to direct all solids remaining on the respective web laterally, so as to be thrown off beyond the edges thereof, the inclined members of the scrapers extending from a substantially central point to the respective edges of the web.

The operation is begun by filling tank 47 with water, and the tanks 46 and 48 with barren solution. Pulp is then supplied through pipe 69, barren solution through pipe 70, and water through pipe 71, the belt 58 being driven, and the air being turned on through pipe 68. The solids of the pulp entering tank 46 begin to settle on the several webs 60 and continue until they are brought above a line of air jets, whereupon they are agitated and commingled with the replacing fluid until they gradually work out of the line of agitation and again settle upon the webs, and thus remain until again agitated, and so on intermittently during their movement throughout the length of the tank 46, the progression of the solids being intermittently interrupted. The replacing liquid is supplied in sufficient quantity to cause the progressive movement of the fluid toward tank 48, while the solids are mechanically forced in the opposite direction by the movement of the several webs of the belt. The direction of movement of the solids is indicated by the single pointed arrow in Fig. 13, the direction of movement of the belt being also likewise indicated, while the direction of movement of the liquid is indicated therein by the double pointed arrow.

During operation, certain quantities of the solids, as, for instance, the sands, find their way down to the bottom of the trough 46, and will be scraped along by the bars or slats 63, thereby being given a rolling or tumbling movement, and thus exposing ever-changing surfaces of small masses of settled pulp or sands to the action of replacing fluid while advancing in a direction opposite to the movement of the replacing fluid.

A further apparatus which is designed for and capable of effectively carrying out the process is illustrated in Figs. 20 to 31 inclusive, wherein 75 indicates an elongated trough or tank having a series of hopper bottoms 76, spaced apart as indicated in Fig. 20, the last or final one of which discharges into a flexible tube or hose 77, the free end of which may be varied in elevation for controlling discharge of tailings, that is, settled solids which have been treated. Each of the other hoppers discharges into a valved tube 78 which communicates with a rotary or other appropriate pump 79 which acts as a disintegrator for the solids. A pipe 80 extends from the discharge of each pump 79 to the tank 75 just in the rear of the upper end of the respective hopper 76.

Arranged within the tank 75 is a series of baskets 81 of the suction or mechanical settler type, each preferably having two settler surfaces, one at each side. As many baskets 81 may be employed as found desirable, the baskets being arranged end to end, and the number being such as to leave an adequate space in the length of the tank for allowing reciprocation of the baskets as hereinafter described. Each basket is made up of a series of settlers, and each settler consists of an appropriate frame covered by filtering material. A preferred embodiment of each settler consists of a substantially rectangular frame having its upright sides and lower horizontal member formed of a tube 84, the upright sides being connected by the upper horizontal bar 82, which latter bar may be of wood, and the pipe 84 is covered by canvas or other filter fabric 85, the upper edge of the canvas being tacked to the horizontal bar 82. Obviously, the member 82 of the frame may be otherwise formed than of wood, and in such instance, appropriate means of connection or fastening of the upper edge of the canvas will be provided. The sides of fabric 85 are spaced apart at intervals by preferably vertically disposed strips or slats 86, and between such strips the fabric of the sides of the settler is connected together by lines of stitching 87 parallel to the slats. The tube 84 extends across the lower ends of the several slats 86 within the fabric, and its horizontal portion is formed with an upwardly opening slot 88 for receiving the liquor drawn through the fabric which is discharged out through the upright portion of pipe 84, the said upright portion extending upwardly through the bar 82 to a header 89. The header 89 is common to all of the settlers of the respective basket, the header communicating with a discharge pipe 90 which extends forwardly beyond the respective basket in position for discharging into tank 75. Obviously, the initial or first basket has its discharge pipe 90 extending beyond the tank 75, so as to discharge the clarified liquor beyond the tank for precipitation or other treatment, the initial basket thus serving as a suction filter in addition to acting as a settler.

The settlers of a given basket are connected by cross beams 83 which are fixed to the bars 82 and are preferably of the I-beam type. Fixed to each end of each beams 83 is an axle 140, and supporting each axle is a roller 141, preferably peripherally grooved, and disposed to ride upon the respective edge of the tank 75, said beams 83 thus forming both means for connecting the settlers of a given basket and means for movably sustaining the basket. Engaging the extended ends of the axles 140 for all of the several baskets are longitudinal bars 142, one at each side of the tank, which bars extend beyond the baskets and are formed into racks 99 meshing with pinions 100, which pinions are driven by an appropriate motor 101.

A branch pipe 90' connects each pipe 90 with its respective header 89, preferably at an angle, and a steam or other pressure fluid jet pipe 93 is alined with and discharges longitudinally into each pipe 90. A valve 90'' is disposed in each pipe 90 just in advance of the angle, and the respective pipe 93 is provided with a valve 93'. Each valve 90'' has a trip arm 96 adapted to strike and be actuated by a trip 96' disposed on tank 75 at the rear terminus of travel of each basket for moving the valve 90'' from the position indicated in Fig. 27 to that seen in Fig. 28 at the conclusion of rearward travel of the basket. A check trip 96'' is arranged adjacent to trip 96' and is constructed to swing freely as arm 96 passes rearwardly, but to remain rigid and thus actuate arm 96 during forward travel for moving valve 90'' back to the open position indicated in Fig. 29. The trip 96'' is seen in detail in Fig. 31 and consists of a trip finger proper pivoted at its rear edge to a bracket or other support 96$^a$ carried by tank 75, the finger being pressed by a spring 96$^b$ for retaining the same in operative position, so that arm 96 can strike the finger and swing it downwardly out of the way during rearward travel of the arm, but when the arm strikes the trip in moving forwardly the inability of the finger to swing forwardly will produce the desired tripping action and thus move arm 96 to the position indicated in Fig. 29. The valve 93 is provided with arms 94 and 95. A trip 94' of the check type, that is like trip 96'', is arranged in the path of arm 94 adjacent to the terminus of its rearward travel, so that in moving rearwardly to the position indicated in Fig. 28, arm 94 will pass the trip 94' without moving valve 93', but on the return or forward movement arm 94 will be actuated by trip 94' and valve 93' will be closed, as indicated in Fig. 29, the valve 90'' being opened during this beginning of the forward movement. The parts maintain this relation until approaching the forward terminus of their movement, at which time arm 95 strikes a trip 95' and is moved thereby for opening valve 93' as seen in Fig. 30, so that the valves are in the position seen in Fig. 27 as well as 30, that is the position for starting the next cycle of operation. If the parts were adjusted to such nicety as to avoid movement of the arms 96 and 95 past the respective stops 96' and 95' but only into engagement therewith sufficient for the requisite shifting of the valves, said stops might be perfectly rigid, but to avoid the necessity for such nicety of adjustment check stops are preferably employed like stop 96'' disposed to act in the manner above described, but pivoting in the opposite direction.

The end of tank 75 adjacent the motor 91 has arbitrarily been indicated as the front, and the opposite end as the rear, and this terminology will be maintained for convenience.

The present process is carried out in the operation of the structure just described by filling the final hopper 76 with water, and the tank 75 with barren solution, turning on the pressure fluid to the several jets 93, and supplying pulp, barren solution and water through the respective supply means 103, 104 and 105, controlled by apparatus, not illustrated, such as set forth in detail with respect to Fig. 1. The settler baskets being in their forward position, the injector jets will suck liquor from the contained mass through the fabric of the settlers and discharge the same back into the tank 75 in advance of the respective basket, except the initial jet which discharges outside of tank 75 to any appropriate launder for further disposal, as precipitation. This action continues for a time sufficient for the superinduced settling of solids on the settler surfaces to form appropriate cakes for purposes of discharge and intermingling, that is, such cakes as are of sufficient thickness or density to be capable of being blown off and not sufficiently thick or dense as to fail to intermingle with the fluid when blown off and acted upon by the pump 79. Thereupon the operator starts motor 101 and slowly moves the settler baskets rearwardly, the movement being sufficiently slow to avoid appreciable attrition and being continued until the rearmost basket is above the final hopper, and all the other baskets are proportionately in the rear of their former position. As the baskets are arriving in this position, arm 96 of each basket will strike its respective trip 96' and give the respective valve 90'' a closing movement, thus reversing the pressure fluid current by directing the same back along branch 90', and blowing off the cakes from the settler surfaces, some of which cakes fall down the hoppers 76 and some of which fall upon the flat surface of the bottom of tank 75. The operator then reverses motor 101 and moves the several baskets back to their initial position, the speed of the motor during the return movement being increased for quickly returning the baskets. At the beginning of the return movement, arm 96 strikes its coöperating check trip 96'' and valve 90'' and is opened thereby, while arm 94 strikes trip 94' and closes valve 93'. Thus the settlers, while moving rapidly to their forward position, remain inactive as settlers, but as they are arriving in their forward position the arm 95 of each basket strikes its coöperating trip 95' and its valve 93' is opened thereby, so that the suction again starts as the beginning of the next cycle of operation.

While automatic control of motor 101 is possible, such control is, of course, practicable only where conditions remain substantially constant, as variations in the nature or consistency of the pulp would necessitate proportionate variations in the action of the settlers for attaining the proper cakes of solids.

To provide for the disposition and further treatment of the solids discharged from the settler surfaces and deposited on the floor of tank 75, the settler baskets are provided with scrapers disposed for scraping the solids rearwardly into the next adjacent rear hopper 76 from which the solids are withdrawn by the respective pump 79 and the cakes of solids are broken up thereby and returned to the tank, except, of course, the solids deposited in the final hopper 76 which are withdrawn for disposal as tailings. It is obvious that the solids scraped along the floor of the tank 75 are thereby metallurgically treated by displacement and attack as previously described with respect to settled solids. It is desirable that all scraped solids be directed rearwardly to avoid collection at the front end of the tank, and, therefore, a special construction of scraper is employed, each consisting of a scraper plate 106 fixed to segments 107 disposed to roll on the bottom of the tank, the segments being pivotally connected to the settlers by pins 108 extending from plates 106 through eyes 109 carried by the settlers. A preferred form of connection for each of the eyes 109 to the respective settlers consists of a clamp 110 clamped about the pipe 84 exteriorly of the fabric, the jaws of the clamp terminating short of slot 88 so as not to interfere with the passage. It will be observed that each of said scrapers is disposed for having the plate 106 extend vertically so as to drag along the solids at the bottom of the tank while moving rearwardly, but as soon as the settlers start forwardly, the segments 107 roll upon their peripheries and lift the plate 106 to a horizontal position, thereby presenting the edge of the plate in the path of travel, whereby no dragging or scraping is effected in the forward movement of the scraper.

The solids withdrawn at hoppers 76 cause increase flow of replacing solution toward the fluid-discharge end of tank 75, and the delivery of such solids at points nearer the solids-discharge end of tank 75 coöperates to increase such flow so that the flow is equal to that of the regular advance of fluid toward the fluid discharge end of the tank plus the flow incident to circulation due to withdrawal and delivery of solids.

As a further demonstration of the effectiveness of the phase of the process incident to the agitation and treatment by attrition of the solids after settling, attention is directed to the structure disclosed in Figs. 32 to 37 inclusive, in which 160 indicates a trough or elongated tank having a tailings discharge hopper 161 at its rear end and a clarifying liquor discharge launder 162 at its forward end. A series of carriages 163 is mounted to roll upon the longitudinal edges of the tank, and the several carriages are connected by longitudinal bars or links 164, which links are provided with extensions 165 formed with rack teeth for producing rack bars with which mesh the driving pinions 166 which are carried by a driving shaft 167 and actuated from a motor 168 or other appropriate source of power whereby all of the carriages may be uniformly moved backwardly and forwardly within the tank. Secured to each carriage and pendent therefrom is a bracket 169 and journaled in all of said brackets 169 is a shaft 170, which shaft extends throughout the length of that portion of the tank occupied by the carriages.

Between each two of the brackets 169 is arranged a basket of superimposed adjacent plates 171 preferably of thin sheet material, as a thin gage of sheet iron. Stiffening plates 172 are arranged above and below the several plates 171, the plates 172 being connected by through rods 173, 173 for retaining the plates 171 in their proper relative positions. Spacers, such as washers 174, surround each of the rods 173 and space the several plates 171 apart, the said plates being disposed relatively close together, the space therebetween being approximately one quarter of an inch. As a further means of retaining the relative spacing of the plates 171 at certain points the plates are formed with stamped or otherwise constructed tabs 175 formed from the material of the respective plates, and each adapted to engage a contiguous plate. The rods 173, arranged centrally of the plates, extend through the shaft 170 for causing all of the plates to be revolved when the shaft is revolved, and to accommodate revolution, or partial revolution, of the plates in a limited space, the bottom of tank 160 is formed half round. The several plates 171 are of different widths so that at any cross section through the plates a line drawn to contact with the exposed edges of the plates will describe substantially a circle except at one portion where the plates may be said to be not cut away, leaving a squared corner 176. Below the plates 172 are arranged scrapers 177 which are arcuate and continuous of the circle above mentioned, the several scrapers 177 being disposed for scraping settled solids toward the hopper 161 as later described.

Arranged along each side of the upper portion of tank 160 are baffle devices, each consisting of a longitudinally arranged plate 178 connected by webs 179 with the respective side of the tank, the lower edge of each plate 178 being hinged to the respective side of the tank, and sufficient space being left between the side of the tank and the hinged edge of the plate for allowing ingress and egress of liquid to and from the space inclosed between the webs 179, the respective plate 178 and the adjacent side of the tank. The respective plates 178 are adapted to collapse when the squared corner 179 is moved into engagement therewith.

A cylinder 180 is carried by one of the carriages 163 and supplied with pressure fluid from any appropriate source not illustrated through a controlling valve 181 having an actuating arm 182. A piston 183 depends from the cylinder 180 and is pivotally connected with a crank arm 184 which in turn is fixed to the shaft 170, so that when the piston 183 is at one extreme of its movement the shouldered portion 176 will be at one side of the tank, and when at the opposite extreme said shoulder will be at the other side of the tank.

Arranged along the tank are air lifts 185 which communicate, as at 186, with the bottom of tank 160, and discharge into the tank from above through an appropriately slotted pipe 187, the circulation thus maintained serving to keep the solids in suspension, and to remove solids from the plates by attrition when the plates are disposed vertically.

In operation, the parts being in the position indicated in Fig. 32, tank 160 being filled with barren solution and hopper 161 with water, and the supply of water, barren solution and pulp through launders 189, 190 and 191 respectively being maintained from an appropriate control device such as disclosed in Fig. 1, the settler surfaces are allowed to remain stationary for a sufficient period to have a thin layer of solids settle thereon, say for from one to two minutes, or less according to the character of the pulp being treated, and then the operator starts the motor 168 for moving the carriages rearwardly at a rate approximately ten feet in one minute, or sufficiently slow to avoid attrition, the movement being continued until the rearmost set of plates 171 is above the hopper 161. At this point the arm 182 strikes a trip 188, whereby the valve 181 is shifted for moving the piston 183 to its lowermost position and thus revolving the plates 171 from their horizontal position to a vertical position for facilitating the discharge therefrom of the settled solids thereon. As soon as the plates 170 have been turned to their vertical position, the operator reverses motor 168 and increases the speed thereof so that the surfaces 171 are returned to their former position quickly, say for instance at the rate of six feet in six seconds. The resultant attrition will materially aid in completing the cleansing of the surfaces, and upon arriving at the forward position of the surfaces, the arm 182 strikes a trip 192 and reverses the position of the piston, thereby elevating the arm 184 and returning the plates or surfaces 171 to their horizontal position, and thereupon the motor 168 is stopped for enabling the settling of solids for the next cycle of operation. It will be observed that this attrition incident to the rapid forward movement of the plates 171 is augmented by the attrition due to the circulation induced by the air lifts 185, this latter attrition being operative only when the plates are vertical, the superimposed plates protecting one another when in their horizontal position. The two methods of attrition are thus active at the same time only, and only when needed for intermingling the solids with the displacing liquids.

Obviously, the scrapers 177 act only to scrape the settled solids on the bottom of the tank toward the hopper 161 because in the return movement the several scrapers are disposed up at the side of the tank, the presence of the scrapers obstructing an otherwise free path of movement for fluid. The several plates 178 and their connected parts also effectively serve to prevent passageways for free flowing of liquor along the tank.

In Fig. 36$^a$ is seen a fragment of the rotary reciprocal surfaces shown approximately full size, it being obvious that the other figures showing this type of device are necessarily disproportionate because the juxtaposed surfaces are too thin in actual construction, in the preferred embodiment, for making it physically possible to correctly illustrate in cross section. This will be obvious when it is understood that the single lines seen in Fig. 36$^a$ represent sheets approximately one-hundredth of an inch in thickness. By "juxtaposed surfaces" is meant surfaces having a spacing therebetween which, when provided with effective circulating means, will not be so close as to prevent necessary circulation, and at the same time, not so great as to reduce the square area of the surface to an extent resulting in prohibitive reduction of the output or a prohibitive investment; as for example, surfaces spaced one-quarter of an inch apart with proper precautions for circulation and access of the solids of pulp to the surfaces will operate efficiently, and the space may be somewhat decreased by increasing facilities for circulation, or the space may be increased without deviation from the results so long as the spacing does not become so great that the process cannot be profitably practised.